US 6,658,449 B1

(12) United States Patent
Brenner et al.

(10) Patent No.: US 6,658,449 B1
(45) Date of Patent: Dec. 2, 2003

(54) APPARATUS AND METHOD FOR PERIODIC LOAD BALANCING IN A MULTIPLE RUN QUEUE SYSTEM

(75) Inventors: Larry Bert Brenner, Austin, TX (US); Luke Matthew Browning, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/506,231

(22) Filed: Feb. 17, 2000

(51) Int. Cl.[7] ................................................. G06F 9/00
(52) U.S. Cl. ....................... 709/105; 709/100; 709/102; 709/104; 709/103; 709/108; 709/201; 709/226
(58) Field of Search ................................ 709/104, 103, 709/105, 226, 102, 108, 100, 201

(56) References Cited

U.S. PATENT DOCUMENTS

| | | | | |
|---|---|---|---|---|
| 4,631,674 A | * | 12/1986 | Blandy | 709/105 |
| 5,031,089 A | * | 7/1991 | Liu et al. | 709/226 |
| 5,159,686 A | | 10/1992 | Chastain et al. | 395/650 |
| 5,185,861 A | | 2/1993 | Valencia | 395/200 |
| 5,193,172 A | | 3/1993 | Arai et al. | 395/425 |
| 5,506,987 A | | 4/1996 | Abramson et al. | 395/650 |
| 5,574,939 A | | 11/1996 | Keckler et al. | 395/800 |
| 5,692,193 A | | 11/1997 | Jagannathan et al. | 395/676 |
| 5,745,778 A | * | 4/1998 | Alfieri | 712/1 |
| 5,768,594 A | | 6/1998 | Blelloch et al. | 395/706 |
| 5,784,614 A | | 7/1998 | Davis | 395/672 |
| 5,826,081 A | * | 10/1998 | Zolnowsky | 709/103 |
| 5,872,972 A | * | 2/1999 | Boland et al. | 709/102 |
| 5,887,143 A | | 3/1999 | Saito et al. | 395/200.78 |
| 5,924,097 A | * | 7/1999 | Hill et al. | 707/10 |
| 5,928,322 A | * | 7/1999 | Bitar et al. | 709/103 |
| 5,937,187 A | * | 8/1999 | Kosche et al. | 709/104 |
| 5,938,723 A | | 8/1999 | Hales, II et al. | 709/204 |
| 5,978,829 A | * | 11/1999 | Chung et al. | 709/102 |
| 5,991,808 A | | 11/1999 | Broder et al. | 709/226 |

(List continued on next page.)

OTHER PUBLICATIONS

Poindexter et al. "System for enterprise–wide work flow automation." US Pat. application publication 2003/0093458 A1.*
DeBettencourt et al., Web service, U.S. patent application Publication 2002/0042823 A1.*
LiVecchi, Performance enhancements for threaded servers, U.S. patent application Publication 2001/0018701 A1.*
TechEncyclopedia Multithreading; www.techweb.com; pp. 1–2.
Boland, Vernon. "Method and Apparatus for Allocating Network Resources and Changing the Allocation Based on Dynamic Workload Changes". U.S. patent application Publication 2001/0003831 A1.
Nemirovsky et al. "Interstream Control and Communications for Multi–Steaming Digital Processors". U.S. patent application Publication 2002/0095565 A1.
Cota–Robles, Erik. "Priority Based Simultaneous Multi–Threading". U.S. patent application Publication 2001/0056456 A1.

Primary Examiner—John Follansbee
Assistant Examiner—Lilian Vo
(74) Attorney, Agent, or Firm—Duke W. Yee; Volel Emile; Stephen J. Walder, Jr.

(57) ABSTRACT

An apparatus and methods for periodic load balancing in a multiple run queue system are provided. The apparatus includes a controller, memory, initial load balancing device, idle load balancing device, periodic load balancing device, and starvation load balancing device. The apparatus performs initial load balancing, idle load balancing, periodic load balancing and starvation load balancing to ensure that the workloads for the processors of the system are optimally balanced.

21 Claims, 11 Drawing Sheets

U.S. PATENT DOCUMENTS

| | | | |
|---|---|---|---|
| 6,026,425 A | * | 2/2000 | Suguri et al. ............... 709/105 |
| 6,094,663 A | | 7/2000 | Snow et al. ................. 707/201 |
| 6,101,524 A | | 8/2000 | Choi et al. .................. 709/102 |
| 6,105,053 A | * | 8/2000 | Kimmel et al. ............. 709/105 |
| 6,125,363 A | * | 9/2000 | Buzzeo et al. .............. 707/100 |
| 6,128,642 A | * | 10/2000 | Doraswamy et al. ........ 709/201 |
| 6,222,822 B1 | * | 4/2001 | Gerardin et al. ............ 370/230 |
| 6,247,025 B1 | | 6/2001 | Bacon ........................ 707/206 |
| 6,247,044 B1 | | 6/2001 | Gosling et al. ............. 709/203 |
| 6,260,057 B1 | * | 7/2001 | Eykholt et al. ............. 709/102 |
| 6,266,745 B1 | * | 7/2001 | de Backer et al. .......... 711/147 |
| 6,269,390 B1 | | 7/2001 | Boland ....................... 709/100 |
| 6,279,124 B1 | | 8/2001 | Brouwer et al. ............... 714/38 |
| 6,289,369 B1 | * | 9/2001 | Sundaresan ................. 709/103 |
| 6,292,822 B1 | | 9/2001 | Hardwick ................... 709/105 |
| 6,298,386 B1 | | 10/2001 | Vahalia et al. ............... 709/234 |
| 6,351,775 B1 | * | 2/2002 | Yu ............................. 709/238 |
| 6,385,638 B1 | | 5/2002 | Baker-Harvey ............. 709/107 |
| 6,389,451 B1 | | 5/2002 | Hart ........................... 709/201 |
| 6,418,460 B1 | * | 7/2002 | Bitar et al. ................. 709/108 |
| 6,434,591 B1 | | 8/2002 | Watakabe et al. ........... 709/103 |
| 6,453,356 B1 | | 9/2002 | Sheard et al. ............... 709/231 |
| 6,469,991 B1 | * | 10/2002 | Chuah ........................ 370/329 |
| 6,490,611 B1 | | 12/2002 | Shen et al. ................. 709/103 |

* cited by examiner

APPARATUS AND METHOD FOR PERIODIC LOAD BALANCING IN A MULTIPLE RUN QUEUE SYSTEM This application is directed to similar subject matter as commonly assigned U.S. patent application Ser. No. 09/506,230 entitled "Apparatus and Method for Dispatching Fixed Priority Threads Using a Global Run Queue in a Multiple Run Queue System" and Ser. No. 09/506,856 entitled "Apparatus and Method for Starvation Load Balancing Using a Global Run Queue in a Multiple Run Queue System", both filed on Feb. 17, 2000, and both are hereby incorporated by reference in their entirety.

BACKGROUND OF THE INVENTION

1. Technical Field

The invention is directed to apparatus and methods for periodic load balancing in a multiple run queue system.

2. Description of Related Art

Multiple processor systems are generally known in the art. In a multiple processor system, a process may be shared by a plurality of processors. The process is broken up into threads which may be processed concurrently. However, the threads must be queued for each of the processors of the multiple processor system before they may be executed by a processor.

One known technique for queuing threads to be dispatched by a processor in a multiple processor system is to maintain a single centralized queue, or "run queue." As processors become available, they take the next thread in the queue and process it. The drawback to this approach is that the centralized queue becomes a bottleneck for the threads and processing time may be lost due to processors spinning on a run queue lock, i.e. becoming idle, while waiting to take the next thread from the centralized queue.

Another known technique for queuing threads is to maintain separate queues for each processor. Thus, when a thread is created, it is assigned to a processor in a round robin fashion. With such a technique, some processors may become overloaded while other processors are relatively idle. Furthermore, some low priority threads may become starved, i.e. are not provided with any processing time, because higher priority threads are added to the run queue of the processor for which the low priority threads are waiting.

Thus, there is a need for new technology to provide apparatus and methods for balancing the workload of a multiple processor system while maintaining a high throughput in the multiple processor system.

SUMMARY OF THE INVENTION

The present invention provides apparatus and methods for periodic load balancing in a multiple run queue system. The apparatus performs initial load balancing, idle load balancing, periodic load balancing and starvation load balancing, to ensure that the workloads for the processors of the system are optimally balanced. Initial load balancing addresses to which run queue a new thread of a process should be assigned. Idle load balancing addresses how to shift threads from one run queue to another when a processor is becoming idle. Periodic load balancing addresses how to shift threads from the heaviest loaded run queue to the lightest loaded run queue in order to maintain a load balance. Starvation load balancing addresses how to requeue threads that are being starved of processor processing time.

These techniques make use of global and local run queues to perform load balancing. The global run queue is associated with a node of processors which service the global run queue. Each processor within the node also services a local run queue. Thus, each processor in a node services both the global run queue and a local run queue.

Initial load balancing makes use of the global run queue to place threads that are not able to be placed directly in the local run queue of an idle processor. Starvation load balancing makes use of the global run queue to place threads that have been starved for processor time in order to provide a greater likelihood that a less busy processor will dispatch the thread.

Idle load balancing and periodic load balancing attempt to shift threads from one local run queue to another in an effort to balance the workloads of the processors of the system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
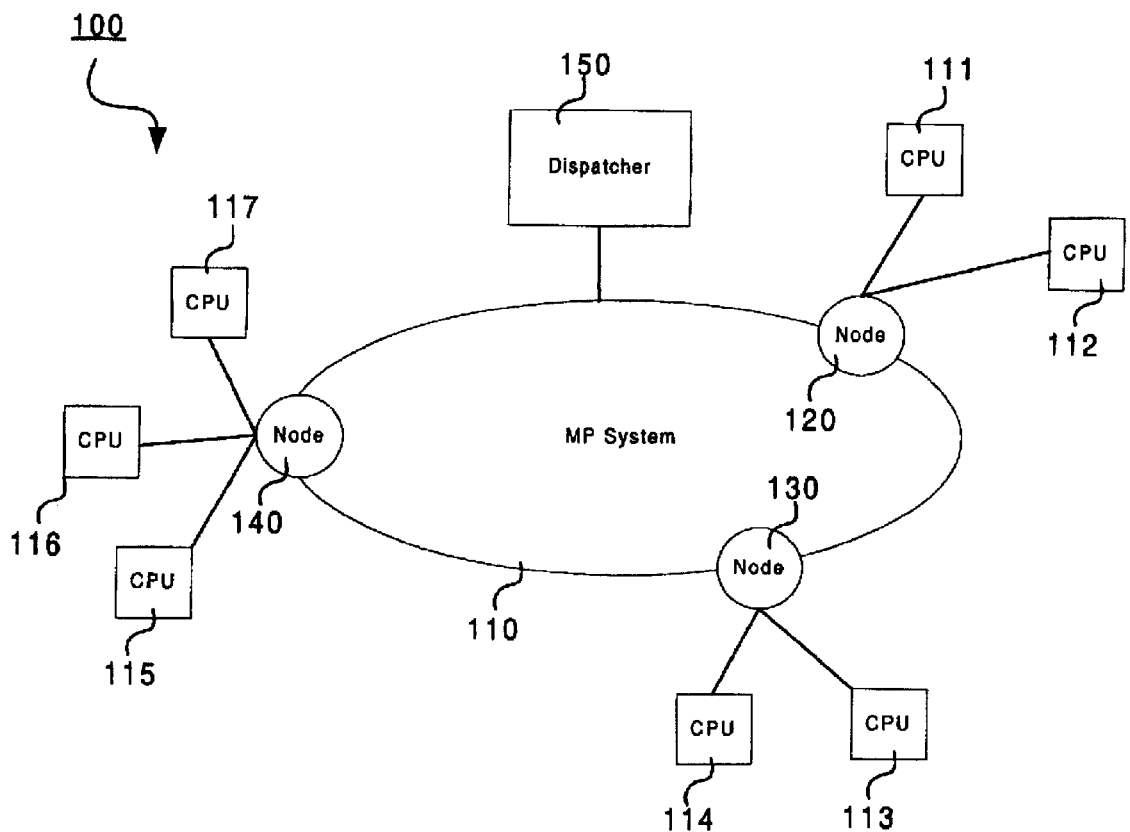
FIG. 1 is an exemplary block diagram of a multiple run queue system.

FIG. 1 is an exemplary diagram of a multiple run queue system 100 in which the present invention may be implemented. As shown in FIG. 1, the system 100 includes a multiple processor (MP) system 110, a plurality of CPUs 111–117 organized into nodes 120–140, and a dispatcher 150.

The MP system 110 may be any type of system having a plurality of processors, such as CPUs 111–117. The CPUs 111–117 are any type of processing device capable of processing assigned data processing jobs. The CPUs 111–117 are organized into nodes 120–140. The nodes 120–140 may not be actual devices in themselves, but may be considered representations of the partition of CPUs 111–117 into groups. Thus, for example, CPUs 111 and 112 are associated with node 120, CPUs 113 and 114 are contained in node 130, and CPUs 115–117 are contained in node 140.

The dispatcher 150 performs load balancing of the jobs among the nodes 120–140 and the CPUs 111–117. Although the dispatcher 150 is shown as a single centralized device, the dispatcher 150 may be distributed throughout the MP system 110. For example, the dispatcher 150 may be distributed such that a separate dispatcher 150 may be associated with each node 120–140 or a group of nodes 120–140. Furthermore, the dispatcher 150 may be implemented as software instructions run on each CPU 111–117 of the MP system 110.

Each CPU 111–117 has an associated local run queue and each node 120–140 has an associated global run queue. Thus, each CPU 111–117 services a single local run queue and each CPU 111–117 in a node 120–140 services the global run queue for that node. For example, CPUs 111 and 112 both service the global run queue associated with the node 120.

Although in the preferred embodiment there is a one-to-one correspondence between CPUs 111–117 and local run queues, the invention is not limited to such an embodiment. Rather, the local run queues may be shared by more than one CPU in the node. Thus, for example, CPUs 115 and 116 may share a single local run queue while CPU 117 utilizes a second local run queue.

The global and local run queues are populated by threads. A thread is an individual transaction in a multithreaded environment. An environment is a multithreaded environment if the environment permits multitasking within a single program. Multithreading allows multiple streams of execution to take place concurrently within the same program, each stream processing a different transaction or message. See <www.techweb.com>.

The global run queue of a node competes with the corresponding local run queues for CPUs to service its threads. Threads that are present in the global run queue and threads in the local run queues seek processing time from the CPUs and thus, compete on a priority basis for the CPUs' resources.

The threads in a run queue (local and global) may have priorities associated with them. The run queue maintains the priority information of the highest waiting thread on the run queue in a run queue structure. The dispatcher 150 uses this priority information to make decisions of which run queue to search for the next thread to dispatch.

When both the global and local run queues have threads waiting that are of the same priority, the dispatcher 150 in general selects, as a "tie breaker," the local run queue to dispatch a thread. This preference is used because the threads on the local run queue are serviced only by its assigned CPU(s). On the other hand, the global run queue may be serviced by any CPU assigned to the node.

However, if choosing the local run queue would result in the two consecutive "tie breaks" in favor of the local run queue, the global run queue is chosen instead. The reason for this is to avoid starvation of the global run queue by repeatedly choosing the local run queue unconditionally.

When a run queue (local or global) is selected for dispatch of a thread, the dispatcher 150 attempts to lock the run queue. The terms "locking" a run queue or acquiring a "run queue's lock" refer to the dispatcher 150 restricting access to the run queue in order to avoid alterations of the run queue while the dispatcher 150 attempts to dispatch a thread.

If an attempt to lock the global run queue is unsuccessful, e.g. another CPU has locked the global run queue, the dispatcher 150 does not retry the attempt to lock the global run queue, but instead selects a local run queue and attempts to dispatch a thread from it. Retrying a lock attempt on a run queue is referred to as "spinning" on the run queue.

If an attempt to lock the global run queue is successful but there is no thread in the global run queue once the lock has been achieved, the dispatcher 150 selects a local run queue and attempts to dispatch a thread from it. If the lock is successful but the only thread in the global run queue is a thread with a different priority than expected, the dispatcher 150 dispatches the thread anyway.

The threads referred to above are "unbound" threads. A thread is "unbound" if it is not required that the thread be processed by a specific CPU. A thread is a "bound" thread if the thread contains an identifier indicating that the thread must be processed by a particular CPU or CPUs. If a thread is bound to a specific CPU, it must be queued to a local run queue serviced by that CPU.

Normally, an unbound thread, once dispatched on a given CPU, is semi-permanently associated with the local run queue served by that CPU to which unbound thread was assigned. The exception is unbound fixed priority threads running with the POSIX (Portable Operating System Interface for UNIX) compliance flag set. As will be described further hereafter, these threads remain on the global run queue in order to guarantee that they will always be dispatched in strict priority order relative to each other.

Threads are added to the global run queue based on load balancing among the nodes 120–140 and the CPUs 111–117. The load balancing may be performed by the dispatcher 150. Load balancing includes a number of methods of keeping the various run queues of the multiple run queue system 100 equally utilized. Load balancing, according to the present invention, may be viewed as four parts: initial load balancing, idle load balancing, periodic load balancing, and starvation load balancing. Each of these parts will be addressed separately, however they are intended to be implemented in conjunction with one another in order to provide optimum load balancing across the MP system 110.

Initial Load Balancing

Figure 2:
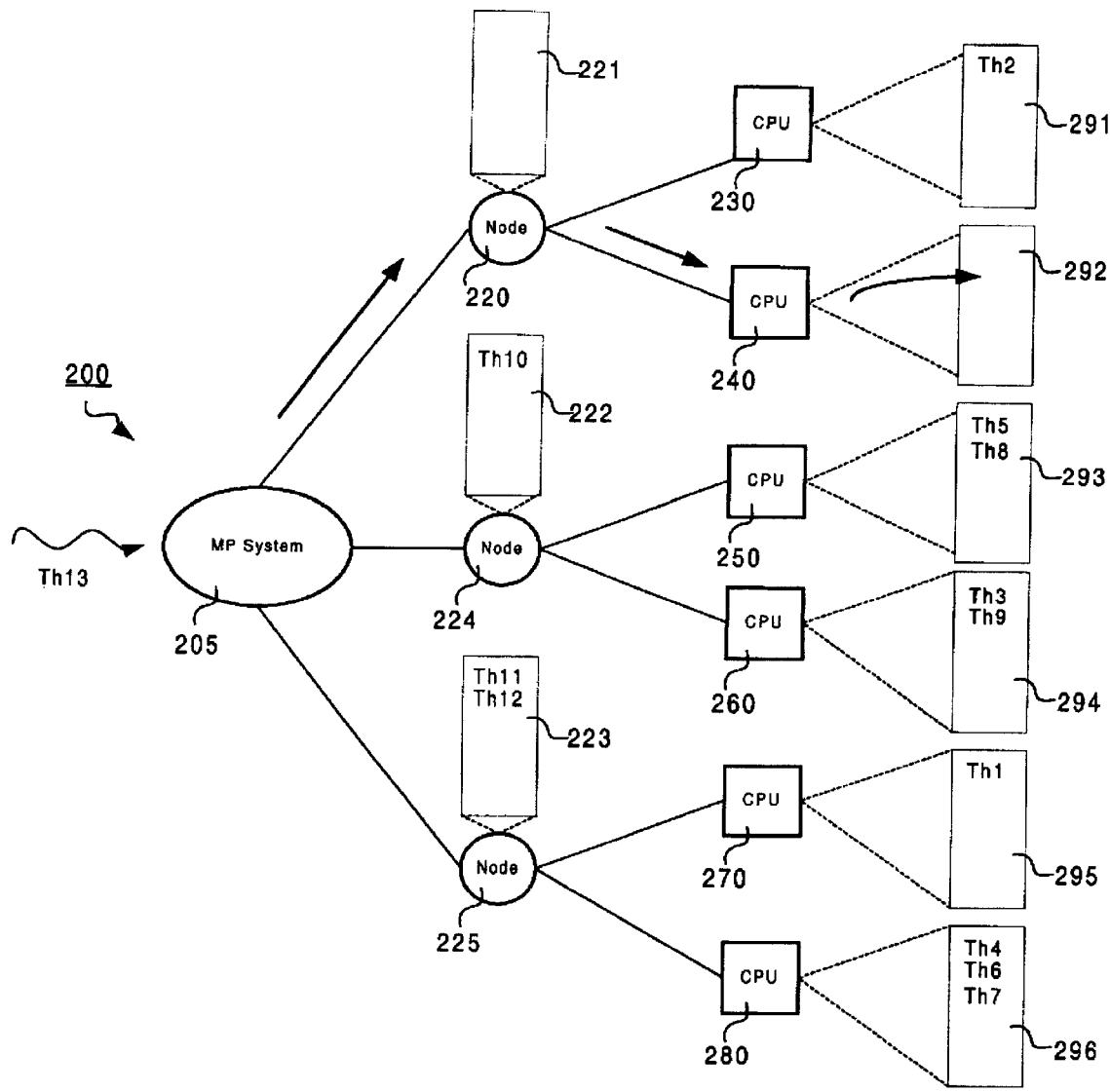
FIG. 2 is an exemplary diagram of a multiple run queue system illustrating an initial load balancing method.
Figure 3:
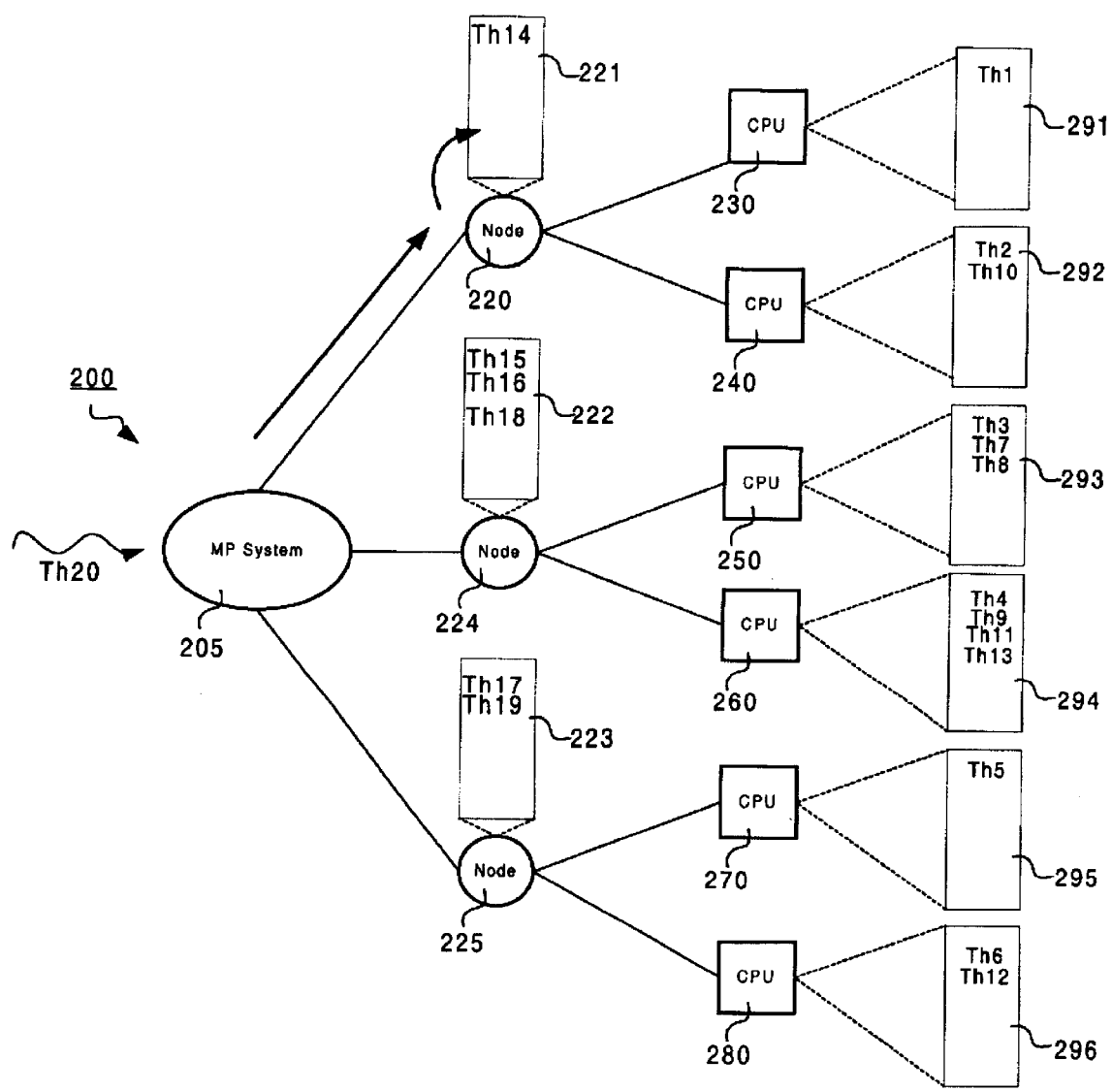
FIG. 3 is an exemplary diagram of a multiple run queue system illustrating an initial load balancing method when an idle CPU is not found.

Initial Load Balancing is the spreading of the workload of new threads across the run queues at the time the new threads are created. FIGS. 2 and 3 are exemplary diagrams of a multiple run queue system 200 illustrating the initial load balancing method.

As shown in FIG. 2, when an unbound new thread Th13 is created as part of a new process, or job, the dispatcher 150 attempts to place the thread in a run queue associated with an idle CPU. To do this, the dispatcher 150 performs a round-robin search among the CPUs 230–280 of the system 200. If an idle CPU is found, the new thread Th13 is added to the local run queue of the idle CPU.

The round-robin search begins with the node/run queue, in the sequence of node/run queues, that falls after the node/run queue to which the last thread was assigned. In this way, the method assigns new threads of a new process to idle CPUs while continuing to spread the threads out across all of the nodes and CPUs.

Thus, applying the round robin technique to the system 200 shown in FIG. 2, the new thread Th13 is assigned to the local run queue 292 associated with idle CPU 240. When the next new thread is created, the round-robin search for an idle CPU will start with CPU 250 and local run queue 293 and will progress through each of the CPUs 260 to 240 and local run queues 294 to 292 of nodes 220, 224 and 225 until an idle CPU is encountered or each CPU/local run queue has been searched.

When an unbound thread is created as part of an existing process, the dispatcher 150 again attempts to place the unbound thread on an idle CPU if one exists. However, the CPUs and corresponding local run queues that are searched are restricted to those associated with the node to which the existing process' threads were assigned. The search is restricted in this manner because it is inefficient to share an address space across a plurality of nodes.

Thus, for example, if the thread Th13 is a new unbound thread that is part of a process to which thread Th9 is a part, the round-robin search for an idle CPU is limited to node 224 and CPUs 250 and 260. Since neither of these CPUs 250 and 260 are idle, the thread Th13 would be assigned to global run queue 222 until one of the CPUs 250 and 260 becomes available to process the thread Th13. At such a time, the thread Th13 will be requeued into the local run queue 293 or 294 of the available CPU 250 or 260.

As shown in FIG. 3, if there are no idle CPUs available for the new thread Th20, the thread Th20 is assigned to the global run queue that is preferred by a round-robin search. In other words, if the thread Th20 is a new thread of a new process, the thread Th20 is assigned to the least full of the global run queues 221–223. In the system 200 shown in FIG. 3, the least full global run queue is global run queue 221. If the thread Th20 is a new thread of an existing process, the thread Th20 is assigned to the global run queue 221–223 of the node 220, 224, or 226 to which the process' threads have been assigned.

Although a round-robin search is utilized by the exemplary embodiment, the invention is not limited to such an approach for assigning threads. Rather, any load placement approach may be used in place of the round robin approach described above.

With the above initial load balancing method, unbound new threads are dispatched quickly, either by assigning them to a presently idle CPU or by assigning them to a global run queue. Threads on a global run queue will tend to be dispatched to the next available CPU in the node, priorities permitting.

In addition to initial load balancing, three other methods are performed to ensure balanced utilization of system resources: idle load balancing, periodic load balancing and starvation load balancing. For clarity, these load balancing methods will be described with reference to a single node and its corresponding CPUs. However, as will be apparent to one of ordinary skill in the art, these methods may be applied to any number of nodes and CPUs without departing from the spirit and scope of the invention.

Idle Load Balancing

Idle Load Balancing applies when a CPU would otherwise go idle and the dispatcher 150 (FIG. 1) attempts to shift the workload from other CPUs onto the potentially idle CPU. However, this shifting process takes into account the beneficial "cache affinity" of threads in the local run queues.

A memory cache is an interim storage that is closer to the speed of the CPU. Memory caches provide a "look-ahead" capability to speed up executing instructions, but the data may stay in the cache for a few seconds or only milliseconds.

A thread may exhibit memory cache affinity when the thread, or related threads from the same process, have been previously executed on that CPU. The "affinity" resides in that some data may still be present in the cache of the CPU and thus, the thread may be processed quicker by making use of the already cached data. In order to take into account the cache affinity while performing load balancing, the following idle load balancing method is performed.

If a CPU is about to become idle, the dispatcher 150 attempts to "steal" threads from other run queues assigned to the node for processing on the potentially idle CPU. The dispatcher 150 scans the local run queues of the node to which the potentially idle CPU is assigned for a local run queue that satisfies the following criteria:

1) the local run queue has the largest number of threads of all the local run queues of the node;
2) the local run queue contains more threads than the node's current steal threshold (defined hereafter);
3) the local run queue contains at least one unbound thread; and
4) the local run queue has not had more threads stolen from it than a maximum steal threshold for the current clock cycle.

If a local run queue meeting these criteria is found, the dispatcher 150 attempts to steal an unbound thread from that local run queue. A thread is stolen from the local run queue after obtaining the selected local run queue's lock. If the local run queue's lock cannot be obtained immediately, repeated attempts are not made.

If the local run queue's lock is obtained, the dispatcher 150 verifies that an unbound thread is still available and the unbound thread with the most favored priority is chosen. The thread is stolen from the local run queue by obtaining the thread's lock and changing the thread's run queue pointer to the run queue pointer for the local run queue assigned to the potentially idle CPU. Again, if the thread's lock is not obtained immediately, the steal attempt is abandoned.

If the thread's lock is obtained and the thread is stolen, the stolen thread is then immediately processed by the CPU and is not actually queued in the local run queue of the potentially idle CPU. This result follows naturally after the stolen thread has completed a dispatch cycle, assuming typical behavior.

Idle load balancing is constrained by the node's steal threshold. The steal threshold is a fraction of the smoothed average load factor on all the local run queues in the node. This load factor is determined by sampling the number of threads on each local run queue at every clock cycle.

For example, if the load factors of the CPUs is 5, 15 and 16 over a period of time, the smoothed average load factor might be 12. The steal threshold may be, for example, ¼ of the smoothed average load factor and thus, may be 3. The steal threshold (¼ in this example) is actually a tunable value.

Accordingly, the local run queue from which threads are to be stolen must have more than 3 threads in the local run queue, at least one of which must be an unbound thread and thus, stealable. The local run queue must also have the largest number of threads of all of the local run queues and must not have had a maximum number of threads stolen from it over the current clock cycle.

Figure 4:
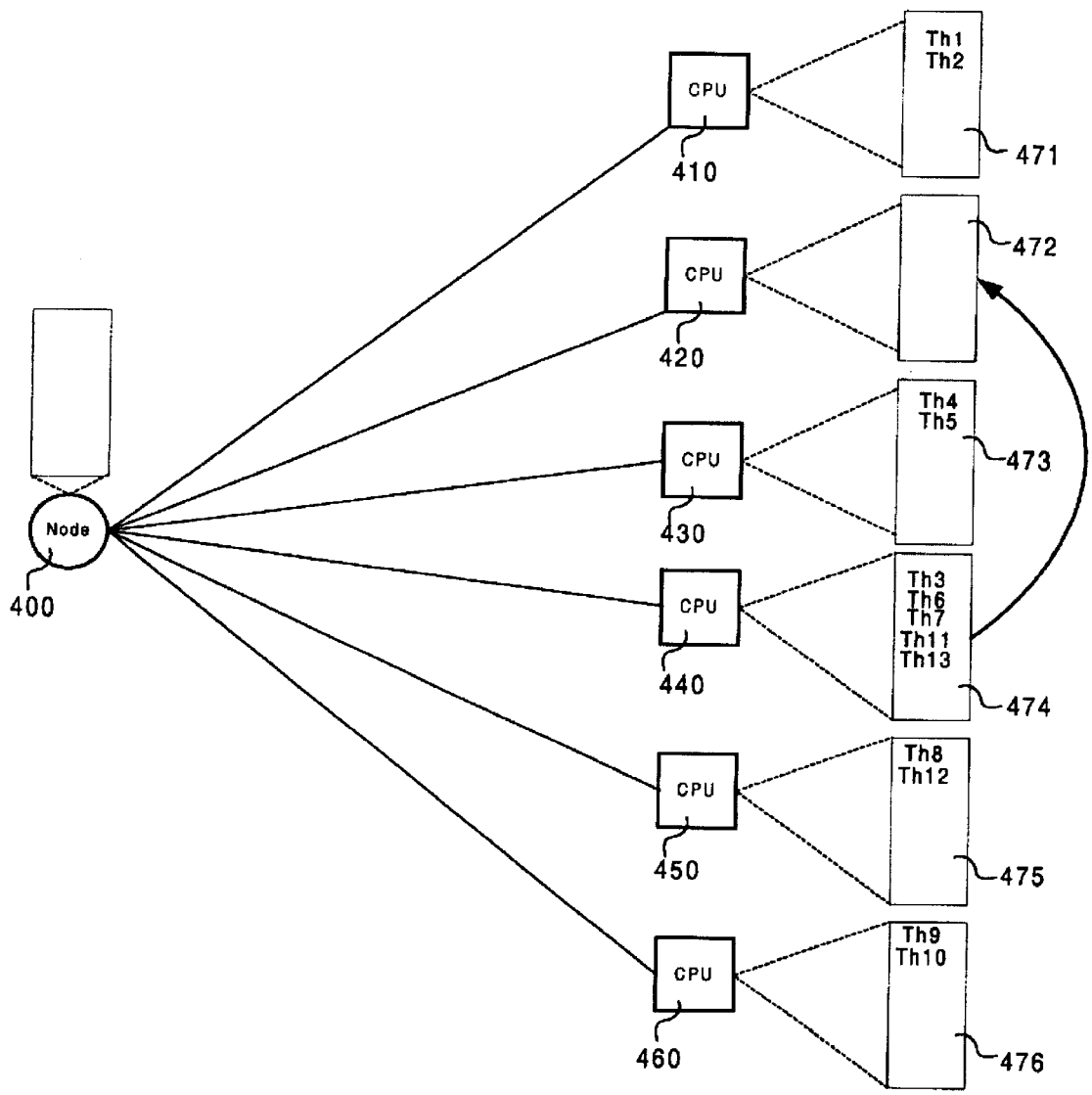
FIG. 4 is an exemplary diagram of a node illustrating an idle load balancing method.

As an example of the above method, consider the node shown in FIG. 4. As shown in FIG. 4, CPU 420 is becoming idle and its associated local run queue 472 and global run queue have no assigned threads. Thus, the idle CPU 420 attempts to steal a thread from another local run queue 471, 473–476.

Taking the above steal criteria into consideration, the local run queue satisfying the above criteria is local run queue 474. This is because local run queue 474 has the most threads of all of the local run queues 471–476 (5 threads). The local run queue 474 contains at least one unbound thread (this is assumed). The local run queue 474 has not reached its maximum number of stolen threads limit (this is also assumed).

The local run queue 474 contains more threads than the node's current steal threshold assuming that the current local run queue workloads represent the average load factors of the local run queues. The steal threshold for the node 400 is currently approximately 1 and the local run queue 474 has 5 assigned threads. Thus, the local run queue 474 meets all of the above steal criteria. Hence, the first unbound thread in local run queue 474 is stolen and its run queue pointer reassigned to local run queue 472.

Periodic Load Balancing

Periodic load balancing is performed every N clock cycles and attempts to balance the workloads of the local run queues of a node in a manner similar to that of idle load balancing. However, periodic load balancing is performed when, in general, all the CPUs have been 100% busy.

Periodic load balancing involves scanning a node's local run queues to identify the local run queues having the largest and smallest number of assigned threads on average, i.e., the local run queues with the highest and lowest load averages, hereafter referred to as the heaviest and lightest local run queues, respectively.

If the lightest local run queue has stolen a thread through idle load balancing in the last N clock cycles, periodic load balancing may not performed. This is because periodic load balancing is directed to addressing the situation where idle load balancing is not occurring and all of the node's CPUs are busy. In addition, this prevents a local run queue that has benefited from idle load balancing from being locked for two consecutive cycles.

If the difference in load factors between the heaviest and lightest local run queues is above a determined threshold, such as 1.5 for example, periodic load balancing may be performed. If the difference is less than the threshold, it is determined that the workloads of the CPUs are well balanced and periodic load balancing is not performed.

If periodic load balancing is to be performed, the dispatcher 150 acquires the heaviest local run queue's lock. In this case, if the lock is not acquired immediately, the dispatcher 150 will make repeated attempts to acquire the local run queue's lock, i.e. the dispatcher 150 will spin on the local run queue's lock.

Once the local run queue's lock is obtained, the dispatcher 150 scans the local run queue for an unbound thread to steal. The scan for stealable unbound threads starts at threads having a medium priority in order to increase the likelihood of stealing a thread that will use enough CPU time to have an impact on the system performance and also to leave high priority threads with their original CPUs. The thread is then stolen in the same manner as described above.

Figure 5:
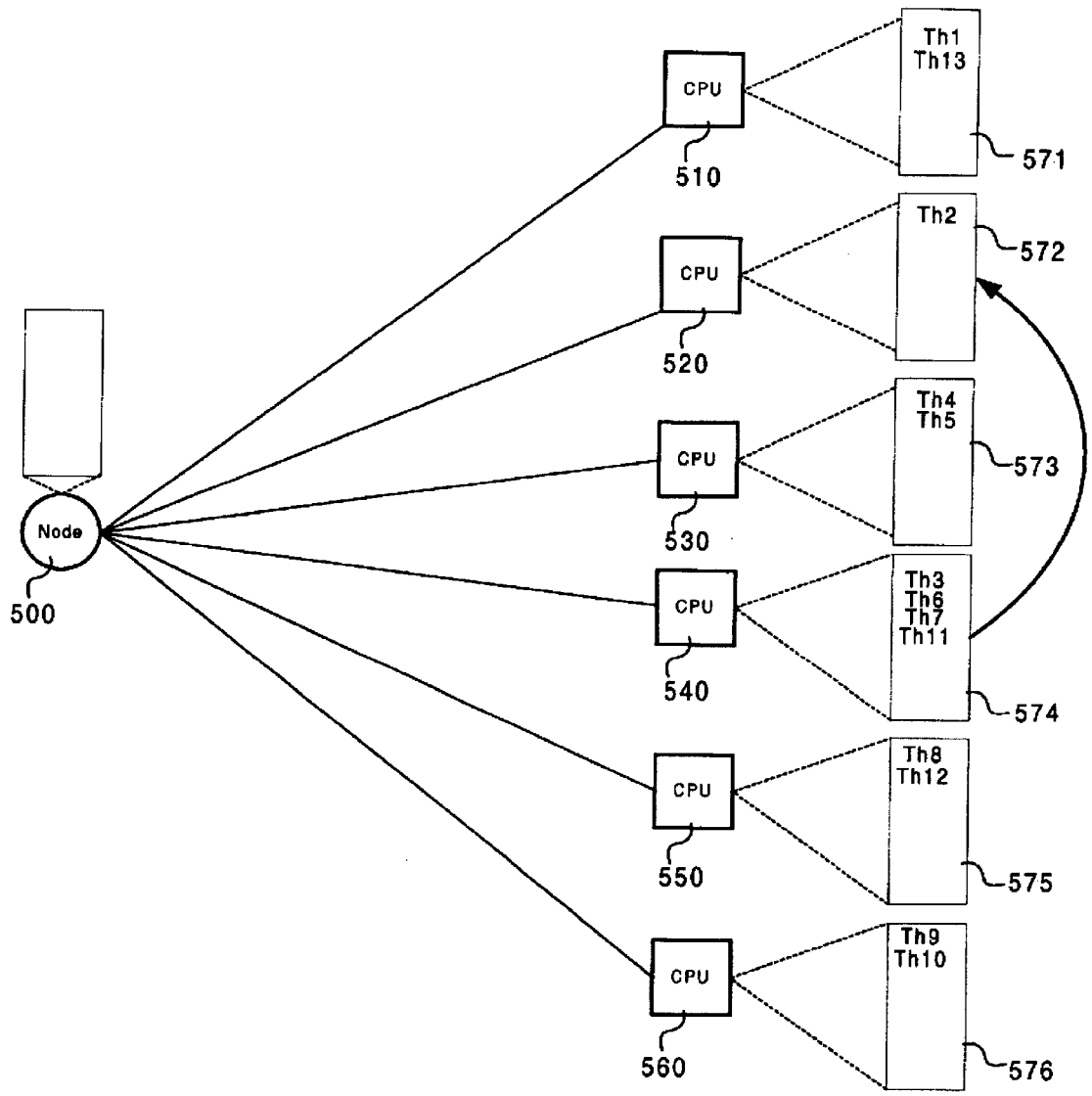
FIG. 5 is an exemplary diagram of a node illustrating a periodic load balancing method.

As an example of periodic load balancing, consider the node 500 shown in FIG. 5. As shown in FIG. 5, each of the CPUs 510–560 are busy with dispatching threads in their respective local run queues 571–576. However, the workloads among the CPUs 510–560 are not balanced. Periodic load balancing finds the heaviest and lightest local run queues, which in this case are local run queues 574 and 572, for example.

Assume that the load factor for local run queue 574 is 4 and the load factor for local run queue 572 is 1. The difference between the load factors is 3 which is higher than 1.5 indicating that the workloads of the local run queues 571–576 are not balanced.

Accordingly, the dispatcher 150 obtains the lock for local run queues 574 and 572 and steals the first unbound thread in local run queue 574 and places it in local run queue 572. In order to avoid having to hold two local run queue 572 and 574 locks at the same time, the stolen thread may be temporarily dequeued and placed in a temporary queue (not shown). The lock on the local run queue 574 may then be released and the lock for the local run queue 572 acquired. The thread may then be requeued in local run queue 572.

Starvation Load Balancing

Starvation Load Balancing is directed to moving unbound threads which have not been dispatched within a predetermined period of time to a global run queue. In this way, undispatched threads from local run queues may be moved to the global run queue where there is a greater likelihood that they will be assigned to a local run queue for a CPU that may be able to dispatch them.

With the starvation load balancing method, each thread is time stamped when it is assigned to a local run queue. At periodic intervals, the dispatcher 150 scans each of the threads in the system to find unbound threads that have been pending on a local run queue for greater than a threshold time amount, for example, greater than 1.5 seconds. If the dispatcher 150 finds any unbound threads meeting this criteria, the dispatcher 150 steals the thread from the local run queue and places it in the global run queue for the node.

In this way, the thread will be dispatched by the next available CPU in the node, priority permitting. Thus, a low priority thread that may not be dispatched due to higher priority threads in one local run queue, may be requeued to a less busy local run queue and will have a greater likelihood of being dispatched.

In addition, by moving threads that are not being dispatched to the global run queue, there is a greater likelihood that load balancing will achieve the desired effect. For example, if a local run queue has a large number of undispatched threads, load balancing will tend to cause dispatching threads to be placed in other local run queues. By removing the undispatched threads to the global run queue, dispatching threads will be spread more evenly among the local run queues.

Figure 6:
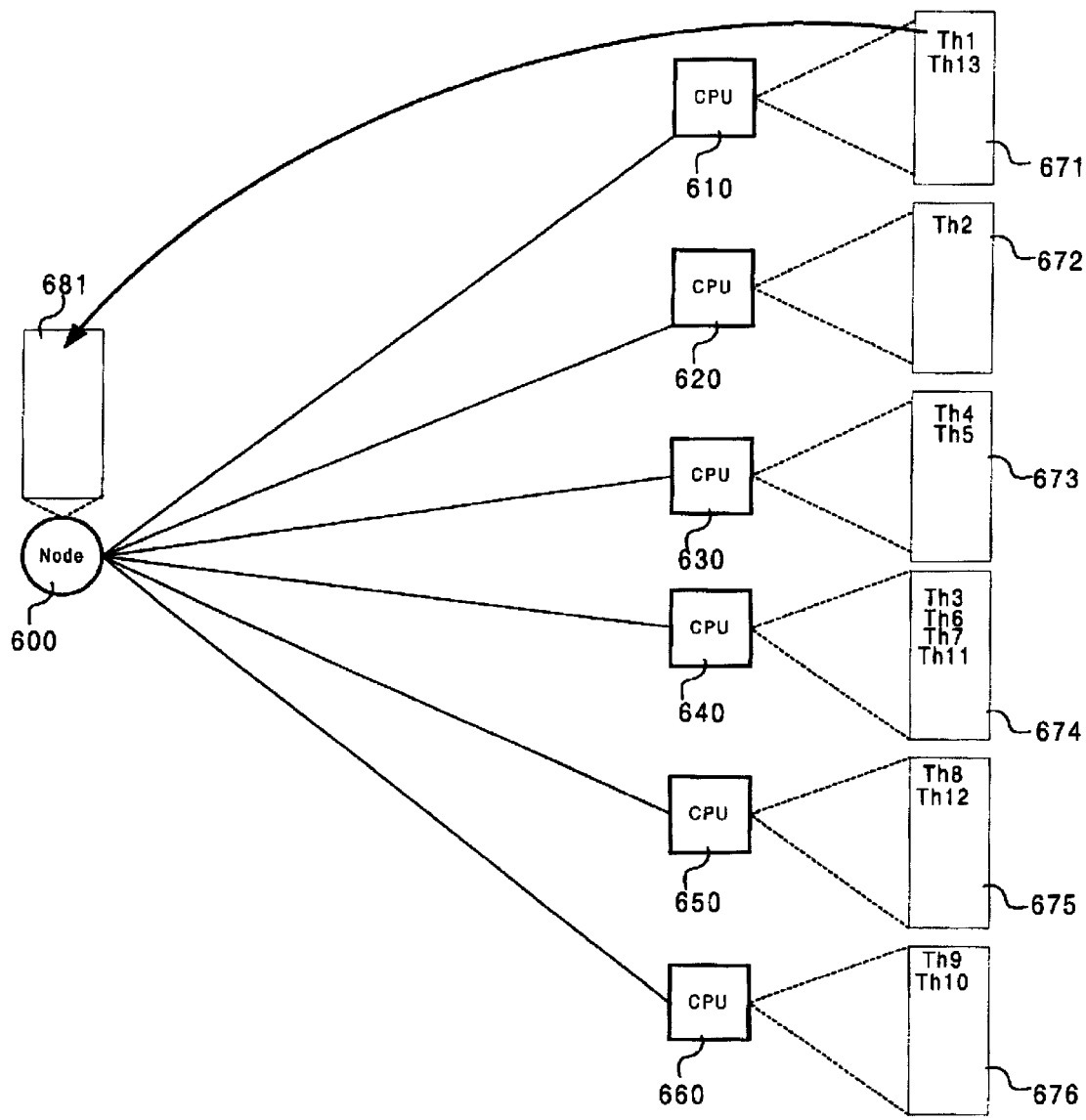
FIG. 6 is an exemplary diagram of a node illustrating a starvation load balancing method.

As an example of starvation load balancing, consider the node 600 in FIG. 6. As shown in FIG. 6, the local run queue 671 includes an unbound thread that has not been dispatched within a threshold amount of time. This unbound thread is located by the dispatcher 150 by scanning the threads of the system, in a single operation, for unbound threads in each of the local run queues 671–676 having time stamps that indicate they have been pending in the local run queue for a time longer than the threshold amount of time.

Once the unbound thread is located, the dispatcher 150 obtains the lock for the local run queue 671 and steals the thread from the local run queue 671 and places it in the global run queue 681. The next available CPU 610–660 allowed to service a thread at the given thread's priority will dispatch the thread, after which it will be assigned to that local run queue 671–676.

Thus, the present invention makes use of initial, idle, periodic and starvation load balancing to achieve an optimum load balance among CPU resources. In this way, CPU resources may be equally utilized and the overall throughput of the system may be increased substantially.

Figure 7:
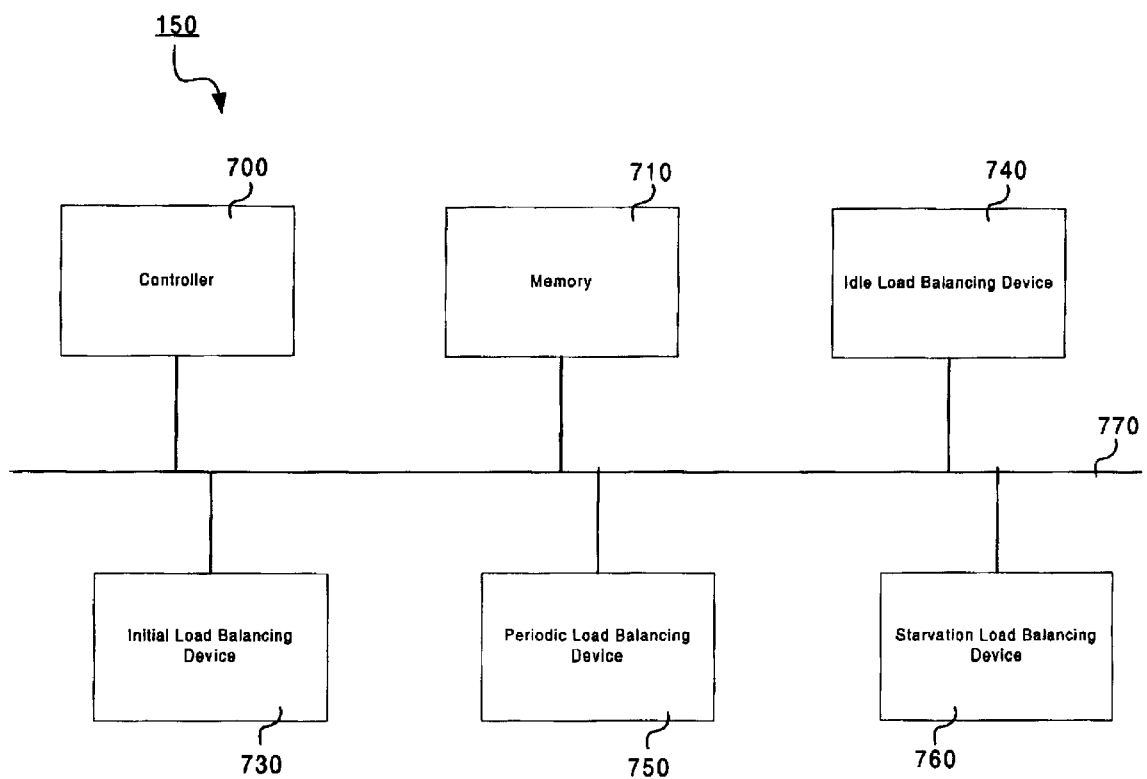
FIG. 7 is an exemplary block diagram of the dispatcher of FIG. 1.

FIG. 7 is an exemplary block diagram of the dispatcher 150 of FIG. 1. As described above, the dispatcher 150 is depicted as a centralized device. However, the invention may be implemented using a distributed dispatcher 150 where, for example, each node or group of nodes has a separate associated dispatcher 150.

Furthermore, each CPU may have an associated dispatcher 150. In such an embodiment, certain load balancing functions may be performed by the dispatchers 150 of each CPU while others may be performed by only certain ones of the dispatchers 150. For example, each dispatcher 150 associated with each CPU may perform idle load balancing when the CPU becomes idle, whereas only the dispatcher 150 associated with a master CPU in a node (usually the lowest numbered CPU) may perform periodic load balancing and starvation load balancing.

As shown in FIG. 7, the dispatcher 150 includes a controller 700, a memory 710, an initial load balancing device 730, an idle load balancing device 740, a periodic load balancing device 750, and a starvation load balancing device 760. These elements 700–760 communicate with one another via the signal/control bus 770. Although a bus architecture is shown in FIG. 7, the invention is not limited to such an architecture. Rather, any type of architecture that allows for communication among the elements 700–750 is intended to be within the spirit and scope of the present invention.

The controller 700 controls the operation of the dispatcher 150 based on, for example, control programs stored in the memory 710. The controller 700 transmits and receives information to and from the nodes via the MP system interface 720. The controller 700 utilizes the initial load balancing device 730 to perform initial load balancing in the manner described above when new threads are generated by a process in the MP system 100. The controller 700 utilizes the idle load balancing device 740 to perform idle load balancing in the manner described above when information is received from a node that a CPU in the node is about to become idle. The controller 700 utilizes the periodic load balancing device 750 to perform periodic load balancing in the manner described above. The starvation load balancing device 760 is utilized to perform starvation load balancing also in the manner described above.

The initial load balancing device 730, idle load balancing device 740, periodic load balancing device 750, and starvation load balancing device 760 may be, for example, programmed microprocessor devices or microcontroller and peripheral integrated circuit elements, an Application Specific Integrated Circuit (ASIC) or other integrated circuit, a hardware electronic or logic circuit such as a discrete element circuit, a programmable logic device such as a PLD, PLA, FPGA or PAL, or the like. In short, any device capable of performing the functions described above and illustrated in the flowcharts of FIGS. 8–11, described hereafter, may be used without departing from the spirit and scope of the present invention.

Figure 8:
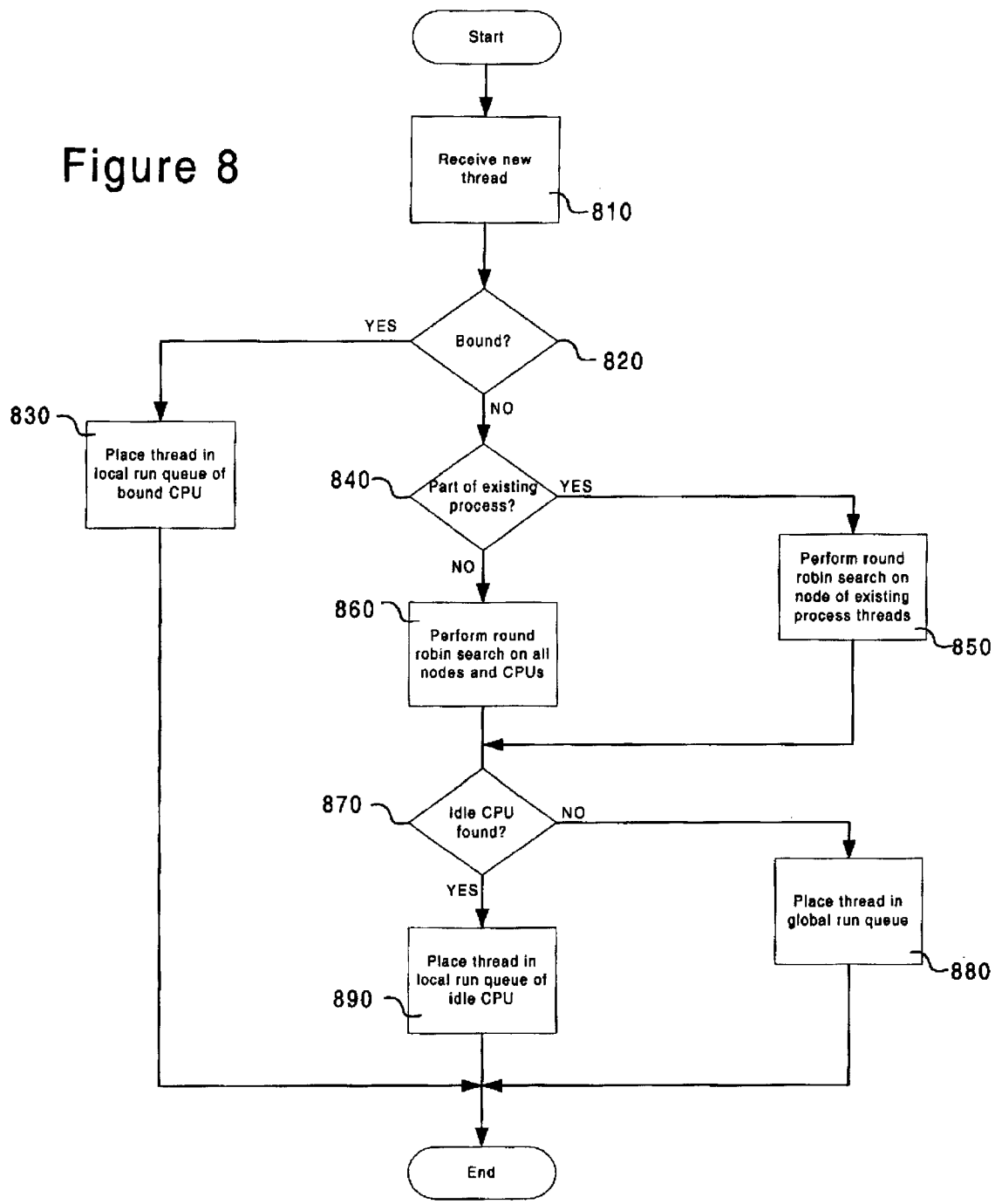
FIG. 8 is a flowchart outlining an exemplary operation of the dispatcher when performing initial load balancing.

FIG. 8 is a flowchart outlining an exemplary operation of the dispatcher 150 when performing initial load balancing. The operation starts with the controller 700 receiving a new thread to be dispatched by a CPU (step 810).

The controller 700 then determines if the new thread is a bound or unbound thread (step 820). This may be performed by reading attribute information associated with the thread indicating whether or not the thread is bound to a particular CPU or is unbound. If the thread is bound (step 820:YES), the controller 700 places the new thread in the local run queue associated with the bound CPU (step 830). If the new thread is unbound (step 820:NO), the controller 700 instructs the initial load balancing device 730 to perform initial load balancing. The initial load balancing device 730 determines if the new thread is part of an existing process (step 840). This may also be performed by reading attribute information associated with the thread.

If the new thread is part of an existing process (step 840:YES), the initial load balancing device 730 performs a round robin search of the CPUs of the node to which the other threads from the existing process were assigned (step 850) looking for an idle CPU. If the new thread is not part of an existing process (step 840:NO), the initial load balancing device 730 performs a round robin search of all nodes and CPUs for an idle CPU (step 860).

The initial load balancing device 730 determines whether or not an idle CPU is found (step 870) and places the new thread in the local run queue of the idle CPU if one is found (step 890). If an idle CPU is not found, the initial load balancing device 730 places the new thread in the global run queue (step 880). If the new thread is part of an existing process, the global run queue to which the new thread is added is the global run queue for the node to which the other threads of the existing process, or the thread which created the current thread, were assigned. If the new thread is not part of an existing process, the global run queue to which the new thread is added is the global run queue preferred based on, for example, a round robin search, although other load placement approaches may be used instead of the round robin search. This is generally the global run queue with the least number of threads.

Figure 9:
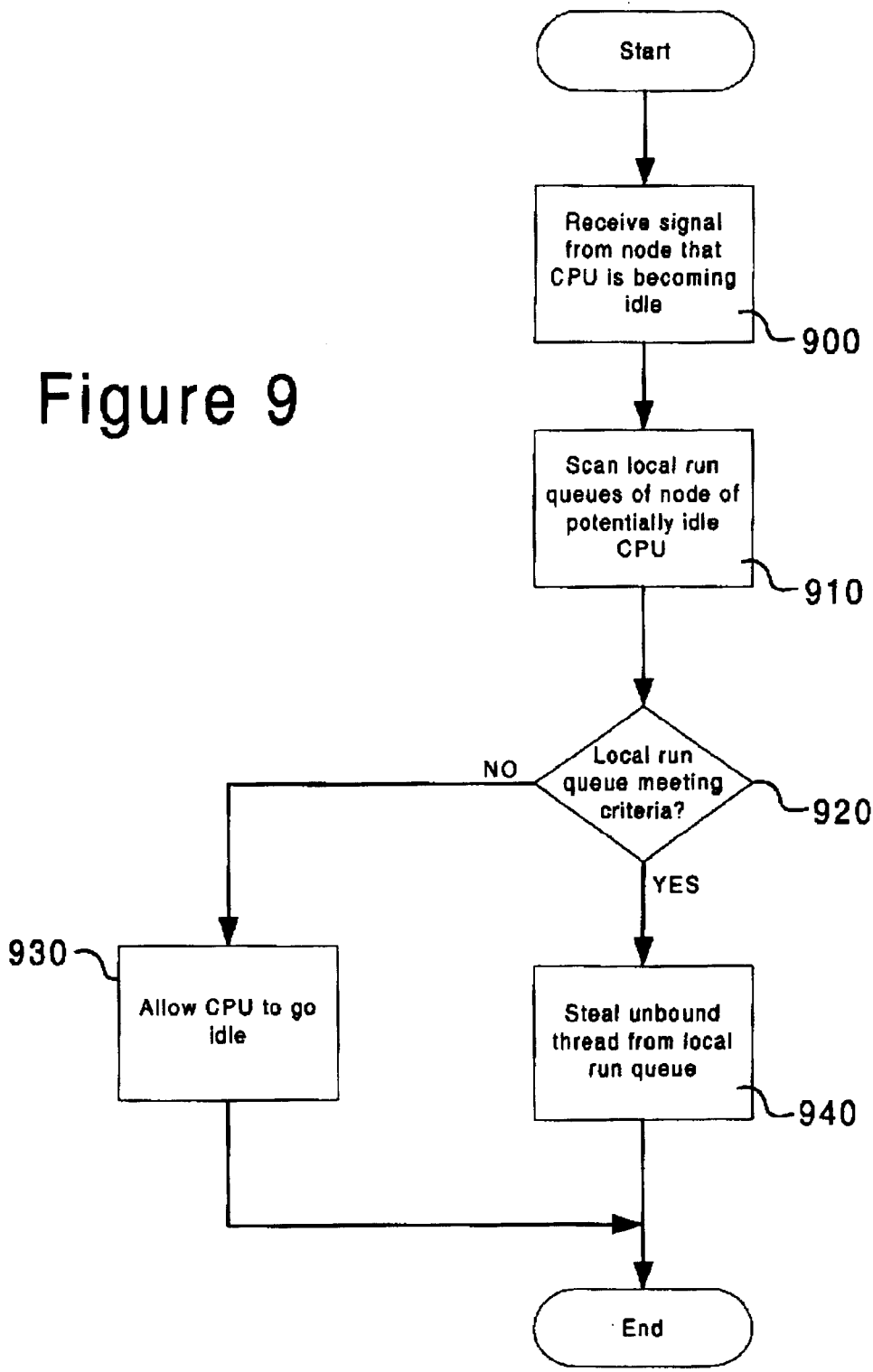
FIG. 9 is a flowchart outlining an exemplary operation of the dispatcher when performing idle load balancing.

FIG. 9 is a flowchart outlining an exemplary operation of the dispatcher 150 when performing idle load balancing. As shown in FIG. 9, the operation starts when the controller 700 instructs the idle load balancing device 740 to perform idle load balancing.

Accordingly, the idle load balancing device 740 scans the local run queues of the node of the potentially idle CPU looking for a local run queue meeting the above described idle load balancing criteria (step 910). If a local run queue meeting the idle load balancing criteria is found (step 920:YES), the idle load balancing device 740 steals a thread from the local run queue meeting the criteria (step 940). If a local run queue meeting the idle load balancing criteria is not found (step 920:NO), the idle load balancing device 740 allows the CPU to go idle (step 930).

Figure 10:
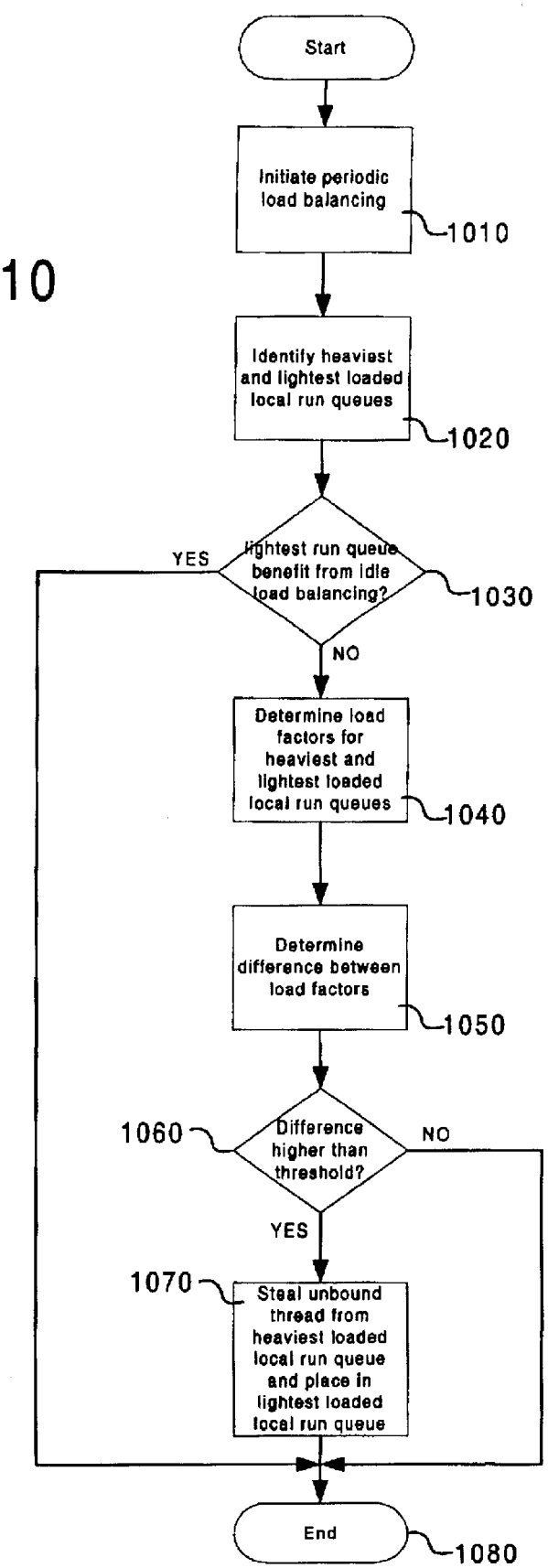
FIG. 10 is a flowchart outlining an exemplary operation of the dispatcher when performing periodic load balancing.

FIG. 10 is an outline of an exemplary operation of the dispatcher 150 when performing periodic load balancing. As shown in FIG. 10, the operation starts when the controller 700 instructs the periodic load balancing device 750 to initiate periodic load balancing (step 1010). This may be performed, for example, based on a periodic timing of the operation.

The periodic load balancing device 750 identifies the heaviest and lightest loaded local run queues and determines the load factors for the heaviest and lightest loaded local run queues (step 1020). The periodic load balancing device 750 then determines if the lightest loaded local run queue has benefited from idle load balancing in the previous clock cycle (step 1030). This may be performed by determining the current setting of a flag in the internal structure representing the local run queue.

If the lightest loaded local run queue did benefit from idle load balancing in the previous clock cycle (step 1030:YES), periodic load balancing is not performed (step 1070).

If the lightest loaded local run queue did not benefit from idle load balancing in the previous clock cycle (step 1030:NO), the periodic load balancing device 750 determines the difference between these load factors (step 1040) and determines if the difference is higher than a threshold amount (step 1050).

If the difference between the load factors is higher than a threshold amount (step 1050:YES), the periodic load balancing device 750 steals an unbound thread from the heaviest loaded local run queue and places it in the lightest loaded local run queue (step 1060). If the difference between the load factors is not higher than the threshold amount (step 1050:NO), the system is well balanced and load balancing is not performed (step 1070).

Figure 11:
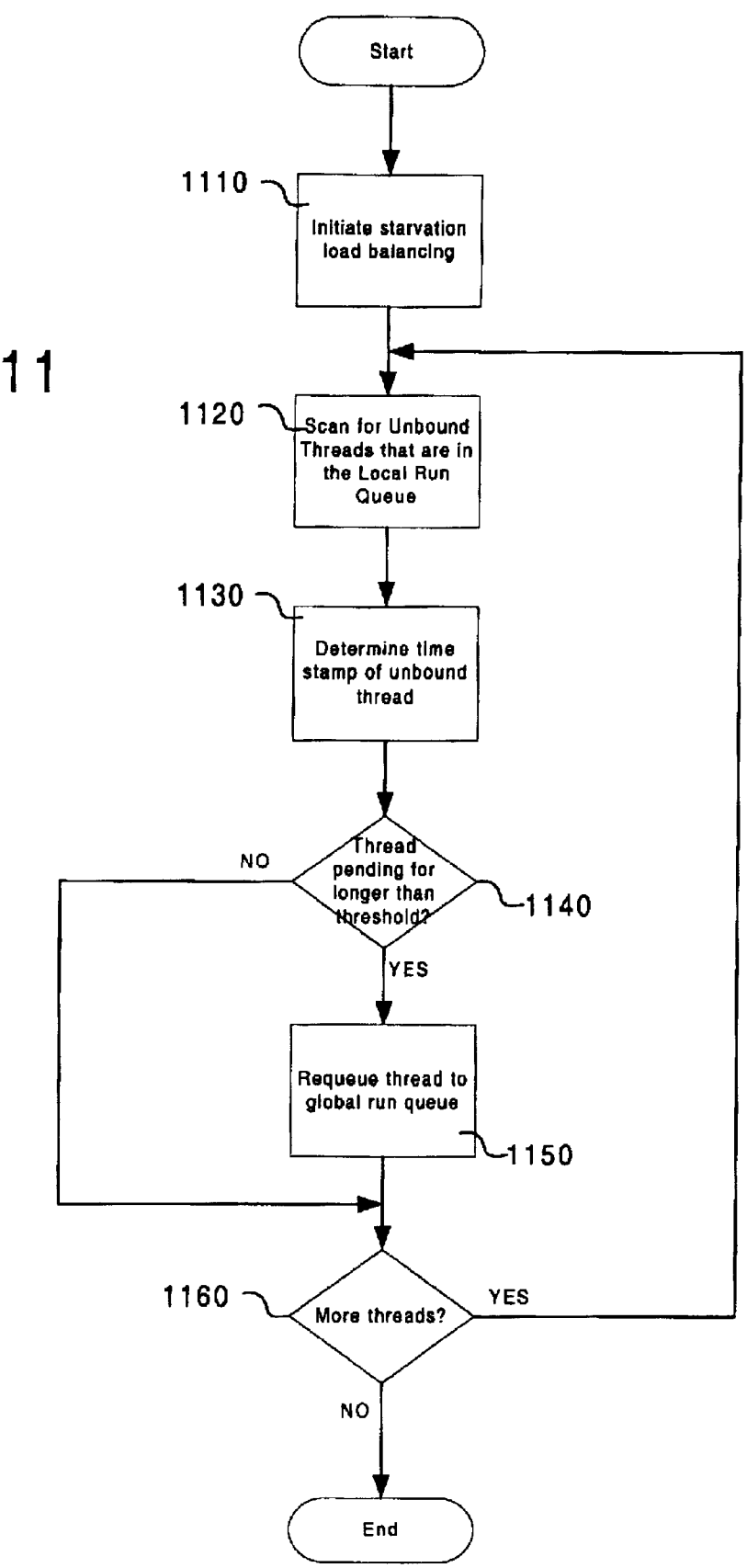
FIG. 11 is a flowchart outlining an exemplary operation of the dispatcher when performing starvation load balancing.

FIG. 11 is a flowchart outlining an exemplary operation of the dispatcher 150 when performing starvation load balancing. As shown in FIG. 11, the operation starts when the controller 700 instructs the starvation load balancing device 760 to perform starvation load balancing (step 1110). This may be performed, for example, based on a periodic timing of the operation.

The starvation load balancing device 760 scans each of the threads in the system for an unbound thread (step 1120). The starvation load balancing device 760 determines the time stamp for the unbound thread (step 1130) and determines if the time stamp indicates that the unbound thread has been pending in a local run queue for longer than a threshold amount of time (step 1140).

If the unbound thread has been pending for longer than the threshold amount of time (step 1140:YES), the starvation load balancing device 760 requeues the unbound thread to the global run queue of the node containing the thread's local run queue. If the unbound thread has not been pending for longer than the threshold amount of time (step 1140:NO), then the unbound thread is left in the local run queue. The starvation load balancing device 760 then determines if there are more threads to search and if so (step 1160:YES), performs the operation repeatedly (steps 1120–1160). If there are no more threads to be searched (step 1160:NO), the operation is ended.

With the present invention, load balancing is achieved in a multiple run queue system by using both global and local run queues. Initial load balancing, idle load balancing, periodic load balancing, and starvation load balancing are performed in conjunction with one another to ensure optimum load balancing among the local run queues.

Fixed Priority Threads

Under certain conditions, threads must be dispatched in a fixed priority order. For example, the in AIX (Advanced Interactive eXecutive) operating system, POSIX compliant processes require that the threads be dispatched in strict priority order. In a multiple run queue system, such as that of the prior art, dispatching threads in strict priority order may not be performed or may require that all of the threads be dispatched to a single CPU.

The present invention avoids this problem by assigning all fixed priority threads, such as POSIX-compliant fixed priority threads, to the global run queue for the first node 120, for example, of the MP system 110. In this way, the threads are guaranteed to be dispatched in strict priority order because the threads are present in a single global run queue and not distributed among a plurality of local run queues.

Automatically assigning fixed priority threads to a global run queue eliminates the benefits obtained by cache affinity since the next CPU that becomes available to dispatch a thread of that priority level will dispatch the next thread in the global run queue. Thus, regardless of possible cache affinity benefits, the fixed priority threads are assigned to whichever CPU becomes available first. However, the benefits of dispatching the fixed priority threads in strict priority order and dispatching them quickly by the next available CPU will tend to offset the loss in cache affinity benefits. The assumption is that fixed priority threads are highly favored threads, and that it is preferable to execute them as soon as possible.

In order to identify the fixed priority threads, the threads must have attribute information that includes a fixed priority flag, such as a POSIX-compliant flag, that may be set when the thread is to be treated as a fixed priority thread. When this flag is set, the dispatcher 150 will assign the thread to the global run queue for the first node 120 of the MP system 110. Then, because each CPU services the global run queue, the CPUs associated with the node will dispatch the threads in strict priority order as the CPUs become available to dispatch the threads. In this way, fixed priority threads, such as POSIX compliant threads, may be utilized with the multiple run queue system according to this invention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of balancing workload among a plurality of local run queues, comprising:

identifying a heaviest local run queue and a lightest local run queue, the heaviest local run queue being a local run queue with a highest load average and the lightest local run queue being a local run queue with a lowest load average;

calculating a difference in load average between the heaviest local run queue and the lightest local run queue; and performing load balancing if the difference exceeds a threshold amount, wherein if the lightest local run queue has benefited from idle load balancing within a determined period of time, load balancing is prevented.

2. The method of claim 1, wherein performing load balancing includes:

identifying an unbound thread assigned to the heaviest local run queue; and reassigning the unbound thread to the lightest local run queue.

3. The method of claim 2, wherein reassigning the unbound thread includes:

obtaining a lock for the unbound thread; and changing a run queue pointer of the thread to identify the lightest local run queue.

4. A method of balancing workload among a plurality of local run queues, comprising:

identifying a heaviest load run queue and a lightest local run queue, the heaviest local run queue being a local run queue with a highest load average and the lightest local run queue being a local run queue with a lowest load average;

calculating a difference in load average between the heaviest local run queue and the lightest local run queue; and performing load balancing if the difference exceeds threshold amount, wherein performing load balancing includes:

identifying an unbound thread assigned to the heaviest local run queue; and reassigning the unbound thread to the lightest local run queue, and wherein identifying an unbound thread includes:

obtaining a lock for the heaviest local run queue; and scanning the heaviest local run queue for an unbound thread, wherein the scanning of the heaviest local run queue starts with threads having a medium priority.

5. The method of claim 3, wherein changing the run queue pointer of the thread to identify the lightest local run queue includes holding the thread in a temporary queue prior to changing the run queue pointer or the thread to identify the lightest local run queue.

6. The method of claim 1, wherein idle load balancing includes:

identifying an idle local run queue;

scanning the plurality of local run queues for a run queue that satisfies idle load balancing criteria; and if a local run queue is found that satisfies the idle load balancing criteria, stealing a thread from the local run queue satisfying the idle load balancing criteria.

7. The method of claim 6, wherein scanning the plurality of local run queues for a run queue that satisfies idle load balancing criteria includes identifying a local run queue that has a largest number of threads, contains more threads than a selected threshold, and contains at least one unbound thread.

8. The method of claim 7, wherein the selected threshold is a fraction of a smoothed average load factor of the plurality of local run queues.

9. A computer program product in a computer readable medium for balancing workload among a plurality of local run queues, comprising:

first instructions for identifying a heaviest local run queue and a lightest local run queue, the heaviest local run queue being a local run queue with a highest load average and the lightest local run queue being a local run queue with a lowest load average;

second instructions for calculating a difference in load average between the heaviest local run queue and the lightest local run queue; and third instructions for performing load balancing if the difference exceeds a threshold amount, wherein the third instructions include instructions for not performing the load balancing if the lightest local run queue has benefited from idle load balancing within a determined period of time.

10. The computer program product of claim 9, wherein the third instructions include:

instructions for identifying an unbound thread assigned to the heaviest local run queue; and instructions for reassigning the unbound thread to the lightest local run queue.

11. The computer program product of claim 10, wherein the instructions for reassigning the unbound thread include:

instructions for obtaining a lock for the unbound thread; and instructions for changing a run queue pointer of the thread to identify the lightest local run queue.

12. A computer program product in a computer readable medium for balancing workload among a plurality of local run queues, comprising:

first instructions for identifying a heaviest local run queue and a lightest local run queue, the heaviest local run queue being a local run queue with a highest load average and the lightest local run queue being a local run queue with a lowest load average;

second instructions for calculating a difference in load average between the heaviest local run queue and the lightest local run queue; and third instructions for performing load balancing if the difference exceeds a threshold amount, wherein the third instructions include:

instructions for identifying an unbound thread assigned to the heaviest local run queue; and instructions for reassigning the unbound thread to the lightest local run queue, and wherein the instructions for identifying an unbound thread include:

instructions for obtaining a lock for the heaviest local run queue; and instructions for scanning the heaviest local run queue for an unbound thread, wherein the scanning of the heaviest local run queue starts with threads having a medium priority.

13. The computer program product of claim 11, wherein the instructions for changing the run queue pointer of the thread to identify the lightest local run queue include instructions for holding the thread in a temporary queue prior to changing the run queue pointer of the thread to identify the lightest local run queue.

14. A workload balancing apparatus for balancing workload among a plurality of local run queues in a multiple run queue system, comprising:

means for identifying a heaviest local run queue and a lightest local run queue, the heaviest local run queue being a local run queue with a highest load average and the lightest local run queue being a local run queue with a lowest load average;

means for calculating a difference in load average between the heaviest local run queue and the lightest local run queue; and means for performing load balancing if the difference exceeds a threshold amount, wherein the means for performing load balancing is inactive if the lightest local run queue has benefited from means for performing idle load balancing within a determined period of time.

15. The apparatus of claim 14, wherein the means for performing load balancing includes:

means for identifying an unbound thread assigned to the heaviest local run queue; and means for reassigning the unbound thread to the lightest local run queue.

16. The apparatus of claim 15, wherein the means for reassigning the unbound thread includes:

means for obtaining a lock for the unbound thread; and means for changing a run queue pointer of the thread to identify the lightest local run queue.

17. A workload balancing apparatus for balancing workload among a plurality of local run queues in a multiple run queue system, comprising:

means for identifying a heaviest local run queue and a lightest local run queue, the heaviest local run queue being a local run queue with a highest load average and the lightest local run queue being a local run queue with a lowest load average;

means for calculating a difference in load average between the heaviest local run queue and the lightest local run queue; and means for performing load balancing if the difference exceeds a threshold amount, wherein the means for performing load balancing includes:

means for identifying an unbound thread assigned to the heaviest local run queue; and means for reassigning the unbound thread to the lightest local run queue, and wherein the means for identifying an unbound thread includes:

means for obtaining a lock for the heaviest local run queue; and means for scanning the heaviest local run queue for an unbound thread, wherein the scanning of the heaviest local run queue starts with threads having a medium priority.

18. The apparatus of claim 16, wherein the means for changing the run queue pointer of the thread to identify the lightest local run queue includes means for holding the thread in a temporary queue prior to changing the run queue pointer of the thread to identify the lightest local run queue.

19. The apparatus of claim 14, wherein the means for idle load balancing includes:

means for identifying an idle local run queue;

means for scanning the plurality of local run queues for a run queue that satisfies idle load balancing criteria; and means for stealing a thread, if a local run queue is found that satisfies the idle load balancing criteria, from the local run queue satisfying the idle load balancing criteria.

20. The apparatus of claim 19, wherein the means for scanning the plurality of local in queues for a run queue that satisfies idle load balancing criteria includes means for identifying a local run queue that has a largest number of threads, contains more threads than a selected threshold, and contains at least one unbound thread.

21. The apparatus of claim 20, wherein the selected threshold is a function of a smoothed average load factor of the plurality of local run queues.

* * * * *

UNITED STATES PATENT AND TRADEMARK OFFICE
CERTIFICATE OF CORRECTION

PATENT NO. : 6,658,449 B1
DATED : December 2, 2003
INVENTOR(S) : Brenner et al.

It is certified that error appears in the above-identified patent and that said Letters Patent is hereby corrected as shown below:

Column 12,
Line 55, after "heaviest" delete "load" and insert -- local --.
Line 63, after "exceeds" insert -- a --.

Column 13,
Line 12, after "pointer" delete "or" and insert -- of --.

Signed and Sealed this

Twenty-seventh Day of December, 2005

JON W. DUDAS
*Director of the United States Patent and Trademark Office*